Patented Nov. 9, 1943

2,333,917

UNITED STATES PATENT OFFICE 2,333,917

COATED FABRIC

Robert Edward Christ and William Edward Hanford, Wilmington, Del., assignors to E. I. du Pont de Nemours & Company, Wilmington, Del., a corporation of Delaware No Drawing. Application July 15, 1941, Serial No. 402,544

9 Claims. (Cl. 117—76)

This invention relates to the art of coating, and more particularly to coated fabrics.

This case is a continuation-in-part of application Serial No. 343,646 filed July 2, 1940.

The manufacture of coated fabrics which are subjected to hard wear, as for example upholstery, hospital sheeting, clothing, etc., has presented several serious difficulties.

For the most part the more desirable of the coatings previously used have been based on rubber and other rubber-like materials, cellulose derivatives, or linseed oil. The rubber coatings require an expensive curing operation. The coatings obtained lack resistance to certain solvents, particularly to those of the hydrocarbon type, and are deficient in flex durability, particularly at low temperatures. They are also limited as to color and shade. Coating layers based upon cellulose derivatives are in general applied from solution which is a tedious, time-consuming operation, requiring a large investment in floor space and solvent recovery equipment. Furthermore, solution coating operations are subject to a health hazard occasioned by the toxic nature of the solvents employed. The resulting coatings are further subject to severe limitations due to their poor solvent resistance and tendency to fail on flexing at low temperatures. Coatings with drying oil type compositions present similar disadvantages, and the products obtained seriously embrittle and discolor on aging.

The high molecular weight polyamides including the superpolyester-amides, obtained by including reactants providing ester groups, have also been proposed in the manufacture of coated fabrics. Although many of the application difficulties referred to above have been avoided, and the products have been improved in some respects, none of the previously obtained materials, insofar as we are aware, possess the desirable combination of properties which characterize the coated fabric obtained by the practice of this invention. The present products cold crack at very low temperatures, and, as shown by the standard flex test, are extremely pliable over a wide temperature range. They are unusually durable, being highly resistant to failure under flexural, scrub, and abrasive action.

This invention has as an object the manufacture of new and improved coated fabrics. A further object is a method for preparing highly durable sheet material suitable for use in artificial leather and like products. Other objects will appear hereinafter.

These objects are accomplished by coating fabrics with a polyester-amide which has been treated with an organic polyisocyanate.

In the preferred method of preparing the polymer forming the coating on the present coated fabric products, the polyester-amide obtained as the initial, usually wax-like, low molecular weight reaction product of a composition containing substantially stoichiometric proportions of amide and ester forming reactants is reacted at temperatures of 150–250° C. with a polyisocyanate in an amount up to 10% and usually from 3 to 7%. This reaction, resulting in a high molecular weight polymer capable of being cold drawn into fibers, is much more rapid than when the polyisocyanate is not used, and the resulting isocyanate treated polymer has a high degree of elasticity or nerve not obtained without this treatment. The mention herein of the polyisocyanates is intended to include the corresponding isothiocyanates which react similarly. The compounds most advantageously used are the diisocyanates.

The reactants from which the polyester-amides, which have recurring amide, ester, and urethane linkages, can be prepared include a variety of bifunctional materials containing hydroxyl, carboxyl, amino, and alkylamino groups, or materials capable of producing these groups. Thus diamines, glycols, and dibasic acids, amino alcohols, amino acids, and hydroxy acids can be employed in any combination that will bring together the essential types of groups in stoichiometrical quantities. As examples, may be mentioned the products formed by the reaction of (1) a dibasic acid, a diamine, and a glycol, or from (2) a dibasic acid and an amino alcohol. In these reactions a dibasic carboxylic acid, or its ester- or amide-forming derivative, is reacted with a bifunctional complementary polyester-amide-forming composition containing amino and hydroxyl groups in amounts such that substantially all the carboxyl groups appear in the final product as intralinear ester and intralinear amido groups. The initial low molecular weight reaction product of these ingredients will have free hydroxyl, amino and carboxyl end groups and a plurality of ester and amide linkages in the chain. They lack in general the desirable properties of hardness, strength, elongation, elasticity, pliability, and flexibility. When these low molecular weight polyester-amides are treated with a polyisocyanate, products of excellent toughness, pliability, and good thermal plasticity are obtained. The polymers for the best results should contain from 50% to 95% ester groups based on the total ester and amide groups present.

Particularly valuable products are obtained in accordance with this invention by calendering over a previously applied base coating of polyamide, and especially of polyesteramide a suitable calendering composition containing the isocyanate treated ester-amide. The polyamide base of the coating is preferably an inter-polyamide obtained by polymerizing a mixture of different polyamide-forming reactants. The polyamides of this kind, as is well known, are made from the types of ingredients hereinafter specifically disclosed, namely, by polymerizing reacting material comprising monoaminomonocarboxylic acids, and mixtures of diamine with dibasic carboxylic acid. It is also desirable to apply a top coat over the isocyanate treated polyester-amide coat.

The invention is further illustrated by the following examples in which the parts are by weight.

Example I

Eighty-five parts of diisocyanate treated polyesteramide is compounded on rubber rolls at 90° C. with 8.5 parts of lithopone, 2.12 parts of red pigment, and 4.25 parts of dibutyl ammonium oleate as an anti-sticking agent. This composition is then calender coated to a sateen which had been base coated with a composition comprising 19 parts hexamethylenediammonium adipate/aminocaproic acid interpolymer, 19 parts amylbenzenesulfonamide plasticizer, 24 parts hydrogenated ester gum to improve flow, 30 parts ethanol, and 8 parts water. For the calendering operation, the calender rolls are set at the following temperatures: Top roll, 82° C., midroll, 93° C., bottom roll, 71° C. The coated fabric is then embossed with an upholstery grain and top coated with a composition comprising 33 parts of the mentioned interpolyamide, 1.5 parts of the plasticizer, 4.5 parts ethanol, and 1 part water. This coated fabric is then formed into a motor truck seat using conventional fabrication techniques.

The polyisocyanate treated polyamide used in the foregoing example is obtained by the following procedure: A mixture of 409 parts of adipic acid, 103 parts of hexamethylenediammonium adipate (the salt of hexamethylenediamine and adipic acid), 175.5 parts of ethylene glycol, and 50 parts of water is condensed by heating at 200° C. in a stirred, heated, enamel-lined reactor until an acid number of 23 is reached for the product in the reactor. This product is then treated with 23.4 parts of hexamethylene diisocyanate to obtain a tough, fusible polymer which is slowly soluble in an equivolume mixture of methanol and chloroform.

The above fabric in the Schiltknecht flex test flexes at 25° C. 655,000 times before failure as compared to 25,000 to 100,000 for commercial samples of coated fabrics such as fabric coated with rubber which is then vulcanized and surface hardened with a sulfur chloride-bromine treatment. At −15° C. the flexibility of the present product was also markedly greater than that of the commercial sample. The product of the example does not cold crack until −40° C., has high abrasion resistance, and in the scrub test (described in Automotive Industries, 49 (1262–6)) the value obtained is 10,000 as compared to 700 to 5,000 for the commercial sample.

When the diisocyanate treated polyester-amide coating is replaced by the polymer obtained by continued heating of the same ester-amide reactants in the absence of the isocyanate the resulting coated fabric is far inferior to that obtained by the present practice, as shown by the following values: flexibility by the Schildknecht test, 1000; scrub test, 10; cold crack, +40° C.

Example II

Seventy parts of the polyester-amide described in Example I is compounded with 17 parts of carbon black, 10.5 parts of tricresyl phosphate, and 2.5 parts of dibutyl ammonium oleate, the compounding being carried out on rubber rolls at about 115° C. Operating at 110° C. this composition is then calender coated to a fabric which had been base coated with a composition of 80 parts of the hexamethylenediammonium adipate/ethylene adipate interpolymer, 20 parts hydrogenated ester gum, 95 parts ethanol, and 5 parts water. This product is tough and durable and possesses a leather-like surface and feel.

Example III

Fifty-seven and eight-tenths parts of the above mentioned diisocyanate treated polymer is blended on rubber rolls at 90° C. with 28.9 parts of lithopone, 8.7 parts of p-tertiary butylphenol-formaldehyde resin, 216 parts of hexamethylene bis-salicylamide, and 1.7 parts of dibutylammonium oleate. This composition is then calender coated onto a sateen fabric which has been base coated with a composition comprising 38.5 parts of a soluble hexamethylenediammonium adipate/ethylene adipate interpolymer, 3.9 parts of hydrogenated ester gum, 28.8 parts of chloroform, and 28.8 parts of methanol. The temperatures used on the calender rolls were: Top roll, 88° C., middle roll, 85° C., bottom roll, 45° C. The fabric thus obtained shows a higher cold crack value than that of Example I but gives a somewhat lower figure in the flexibility test.

Example IV

The isocyanate treated superpolyester-amide is that obtained by treating the low molecular polymer, described in Example I with 5% of hexamethylenediisocyanate and continuing the polymerization until a tough, fusible polymer slowly soluble in an equivolume mixture of methanol and chloroform is obtained. Twenty-five parts of this polymer is dissolved in 37.5 parts of chloroform and 37.5 parts of methanol and a 10 mil sheet cast from this solution. The sheet so produced is then laid next to sateen which had been wetted with an equivolume mixture of chloroform and methanol and the two placed in a press and subjected to 3000 pounds pressure at 120° C. for 15 minutes. A well anchored, very pliable coated fabric is obtained in this manner.

Example V

A mixture consisting of 195.5 parts of ethylene glycol, 109.9 parts of ethanolamine, 723.1 parts of adipic acid, and 100 parts of water is gradually heated to 170° C. in a stirred, heated reactor. The reactants were heated to 170° C. at atmospheric pressure for 2 hours and then to 200° C./2 mm. for 6 hours. The product at this stage is a soft, sticky wax having an acid number of 10.4. Seventy parts of this wax is mixed with 10 parts of chrome green pigment and then treated with 3.5 parts of hexamethylenediisocyanate in a Werner and Pfleiderer mixer at 175° C.

for 1 hour. The tough rubbery product is removed from the mixer and passed through rubber rolls to form it into rough slabs. The slabs are then cake pressed and the cake sliced into sheets having a thickness of approximately 15 mils. The sliced sheets are placed on a heavy aluminum plate which had been moistened with a high boiling petroleum fraction to prevent adhesion. Next to the polymer sheet is placed a layer of chloroform-soaked sateen followed by another heavy aluminum plate. The plates are placed between the platens of a hydraulic press, the pressure brought to 300 lbs./sq. in. and the temperature is gradually raised to 150-155° C. where it is held for 15 minutes. After cooling to room temperature, the coated fabric is stripped from the metal plate. When tested for its flex resistance this coated fabric withstood 500,000 flexes without failure. It was fabricated into shoes and was worn for a period of three months without scuffing.

*Example VI*

A mixture containing 142.7 parts of ethylene glycol, 140.4 parts of ethanolamine, 671.9 parts of adipic acid, and 100 parts of water is heated at 170° C. at atmospheric pressure for 2 hours, followed by heating at 200° C./2 mm. for 6 hours. The product at this point is a soft, sticky, very thick syrup. A total of 150 parts of this syrup is mixed with 28 parts of bone black and 7.5 parts of hexamethylenediisocyanate in a Werner and Pfleiderer mixer at 200° C. for one hour. This high molecular weight polyester-amide is then compounded with 2% oleic acid on rubber rolls and then transferred by calendering to a high count sateen which had been base coated with an anchor coat composition comprising 25 parts of a hexamethylenediammonium adipate/aminocaproic acid interpolymer, 20 parts of amylbenzenesulfonamide, 20 parts of ethanol, and 10 parts of water. The product had an excellent feel and was quite tough and pliable.

The isocyanate treated polyester-amides are obtained in either soluble or insoluble form, and the method of application will depend therefore on both the particular polymer used and the properties desired in the final coated fabric. The compounding with modifiers and fillers can be carried out in the mixer or on rubber rolls with or without the assistance of a small amount of volatile solvent to assist homogenization. Or the agents, if inert, can be incorporated into the composition by mixing with the original reactants prior to starting the reaction or by mixing with a low molecular weight polyesteramide initially formed but prior to treatment with the polyisocyanate. For most purposes, the quantity of modifiers introduced will range from 3-75% of the final composition with 30-60% being employed to greatest advantage, the amount used depending upon the nature of the polyester-amide being employed and the properties desired in the final product. The method of mixing will likewise depend upon these factors.

In the above examples hexamethylene diisocyanate is used for convenience as the diisocyanate reactant but any organic diisocyanate or diisothiocyanate may be used in its place, including monoisocyanate-monoisothiocyanates, i. e., any compound of the general formula XCNRNCY where X and Y are selected from the group consisting of sulfur and oxygen and R is a divalent organic radical. The invention thus includes the use of ethylene diisocyanate, trimethylene diisocyanate, tetramethylene diisocyanate, hexamethylene diisocyanate, decamethylene diisocyanate, heptylidene diisocyanate and the corresponding diisothiocyanates; cycloalkylene diisocyanates and diisothiocyanates, e. g. cyclopentylene diisocyanate, cyclohexylene diisocyanate; aromatic diisocyanates and diisothiocyanates, e. g. m-phenylene diisocyanate, naphthalene diisocyanate and diphenyl-4,4'-diisocyanate; aliphatic-aromatic diisocyanates and diisothiocyanates, e. g. xylene-1,4-diisocyanate and 4,4'-diphenylenemethane diisocyanate; and diisocyanates and diisothiocyanates containing hetero atoms, such as SCNCH$_2$OCH$_2$NCS and

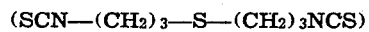

The preferred diisocyanates and diisothiocyanates are of the type, OCN—R—NCO and SCN—R—NCS, wherein R represents saturated divalent hydrocarbon radicals with a chain length of at least two carbon atoms. Of these the polymethylene derivatives are preferred.

While diisocyanates and diisothiocyanates are preferred because of the greater availability and the readiness with which they react, the invention is generic to compounds of the type R(NCX)$_z$ where X is oxygen or sulfur and $z$ is a plural integer, i. e., more than one, including compounds having at least one isocyanate and at least one isothiocyanate group. The invention thus includes the use of polyisocyanates and polyisothiocyanates, e. g., benzene-1,2,4-triisothiocyanate and 1,2,2-triisocyanatobutane.

The lower polymer acted upon by the diisocyanate or diisothiocyanate is made from ingredients comprising a dibasic carboxylic acid or an ester-forming derivative thereof, e. g., a halide, anhydride or an ester with a volatile monohydric alcohol with a complementary bifunctional esterifiable compound in which at least one function is an alcohol.

Any dibasic carboxylic acid or ester-forming derivative thereof may be employed to form the low polymers acted upon by the diisocyanate including carbonic, malonic, succinic, maleic, glutaric, suberic, azelaic, β-methyl adipic, hexahydroterephthalic, diphenic, p-phenylenediacetic, thiodibutyric, acetone-dicarboxylic, diglycollic, pimelic, undecanedioic, isophthalic acid, brassilic, 6-ketoundecanedioic, and 4-ketopimelic acids and anhydrides, acid halides, half-esters and diesters thereof.

The preferred dibasic acids are of the formula HOOC—R—COOH wherein R represents a saturated divalent hydrocarbon radical with a chain length of at least four carbon atoms.

The second essential component of the low molecular weight polymer is the complementary bifunctional esterifiable compound having one alcohol group, the other function being alcoholic or amino. Thus glycols and amino alcohols may be employed.

Any glycol may be employed in the formation of the low polymer, including, in addition to those indicated in the examples, diethylene glycol, triethylene glycol, pentamethylene glycol, hexamethylene glycol, decamethylene glycol and N,N-diethanolaniline.

Any amino alcohol having at least one hydrogen atom attached to the amino nitrogen atom may be employed including aromatic amino alcohols, e. g., p-hydroxymethylbenzylamine, 4-hydroxymethyl-4-aminomethyldiphenyl and p-aminophenylethyl alcohols; aliphatic amino alcohols, e. g., 5-aminopentanol-1; 6-amino-5-methylhexanol-1, 4(p-aminophenyl)cyclohexanol, hydroxyethoxyethoxyethylamine, and N-(β-aminoethyl)-N(ω-hydroxyhexyl)-aniline.

The preferred amino alcohols are of formula HO—R—NH₂ where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

The term polymer connotes a certain minimum sum of the radical lengths of the dibasic carboxylic acid and glycol or amino alcohol. The radical length of the acid is the number of atoms in the chain between and including the carboxyl carbons. The radical length of the glycol is the number of atoms in the chain between and including the hydroxyl oxygens. The radical length of the amino alcohol is the number of atoms between and including the amino nitrogen and the hydroxyl oxygen. Thus in the polymer

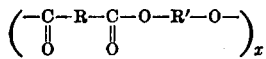

the structural unit is

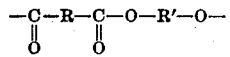

and the unit length is the sum of the radical lengths of the acid whose residue in the polymer is

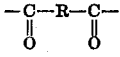

and of the glycol whose residue in the polymer is —O—R'—O—. Similarly the structural unit of a polymer obtained from a dibasic acid and an amino alcohol is

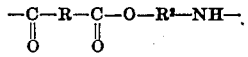

the unit length of which is the sum of the radical lengths of the acid and the amino alcohol. The unit length, as thus defined, of the polymer is at least seven.

Optional bifunctional components include diamines, amino acids, and hydroxy acids.

Any diamine may be employed, which contains at least one hydrogen atom attached to each amino nitrogen atom. The preferred diamines are of formula NH₂RNH₂ where R represents saturated divalent hydrocarbon radicals with a chain length of at least two carbon atoms, e. g., ethylenediamine, hexamethylenediamine, 3-methylhexamethylene-diamine, and decamethylenediamine. However, aromatic diamines such as m-phenylenediamine may also be used.

Any polymerizable monohydroxy monocarboxylic acid or ester-forming derivative thereof may be employed. The preferred hydroxy acids are of formula HO—R—COOH where R represents saturated divalent hydrocarbon radicals, e. g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

Various derivatives of the linear polymer-forming reactants previously mentioned can be used. A number of available compounds, for example, can replace the amino acids, diamines, and dicarboxylic acids, and it is to be understood that mention herein to these reactants is intended to include their equivalent amide-forming derivatives. Amide-forming derivatives of the amino acids include the esters, anhydrides, amides, lactams, acid halides, N-formyl derivatives, carbamates, and nitriles in the presence of water. Amide-forming derivatives of the dicarboxylic acids comprise the mono- and diesters, the anhydrides, the mono- and di-amides, acid halides, and the following compounds in the presence of water: Nitriles, cyanocarboxylic acids, cyanoamides, and cyclic imides. Amide-forming derivatives of the diamines include the carbamates, N-formyl derivatives and the N,N'-diformyl derivatives.

The polyisocyanate treated superpolyester-amide compositions may be applied to the fabric by several methods; calendering, coating from solution, and pressing on preformed sheets. The calendering technique is especially convenient for applying the superpolyester-amide compositions to fabric and is best carried out with even speed rolls which are heated to about 110° C., the exact temperature varying with the particular composition being employed. The sheets may be adhered to the fabric backing by the use of an adhesive, which is best applied from solution.

Fillers and extenders useful in the present products include wood flour, clay, whiting, vermiculite, mica, leather dust, asbestos, silica, cellulose derivatives, etc. Suitable pigments comprise zinc oxide, carbon black, lakes, azo pigments, Prussian blue, chrome green, titanium oxide, iron oxide, lithol red, lithopone, zinc sulfide, iron blue, blanc fixe, and the phthalocyanines.

In order to improve flow and to facilitate sheeting out and smoothing the composition on the rolls, it has been found advantageous to incorporate other modifying agents such as waxes and resins in addition to those mentioned above. Materials which are particularly suited for this purpose include dimethyl sebacate, polyethylene glycol, polyvinyl acetate, and the resins obtained by reacting formaldehyde with p-tertiary butylphenol, p-hydroxydiphenyl, p-tertiary amylphenol, and o-cyclohexylphenol. These and other resinous substances such as rosin, hydrogenated rosin, ester gum, hydrogenated ester gum, shellac, gum kauri, copal, etc. may also be incorporated to improve water resistance and to increase hardness as well as to improve the milling properties of the product. Resins of the heat-hardening type such as the thermosetting phenol-formaldehyde resins, and oil-modified alkyds can be incorporated and subsequently set up by baking to improve the surface hardness.

Plasticizers particularly suitable for the isocyanate treated ester-amides are the sulfonamides such as toluene sulfonamide and N-alkyltoluene sulfonamides, amylbenzenesulfonamide, and N-alkylbenzenesulfonamides. Other plasticizers include phenols such as resorcinol, tertiarybutylphenol, diamylphenol, 4-hydroxydiphenyl, 2-(bis-4-hydroxyphenyl)propane; ether esters such as di-(methoxyethyl)-adipate, di-(methoxyethyl) sebacate; esters such as diethyl phthalate and dibutyl phthalate; and ethers such as the dimethyl ether of tetramethylene glycol.

As stabilizers, materials such as hexamethylene bis-salicylamide, hydroquinone, amino phenols, o-hydroxyphenoxyacetic acid, o-methoxyphenoxyacetic acid, and p-phenylenediacetic acid may be employed. The stabilizers act to improve the resistance of the product to degradation by heat, light and outdoor exposure.

When polyester-amides are being compounded in mixers or rolls, and more particularly when being sheeted and applied to fabrics by calendering, it is advantageous to have present a modifier that will act as an anti-sticking agent and will facilitate release of the material from the working surface of the equipment. To accomplish this it has been found useful to add small quantities of such materials as carnauba wax, diamyl phthalate, dioctyl phthalate, dilauryl phthalate, diethyleneglycol dicresyl ether, ethyleneglycol monobenzyl ether, stearic acid, oleic acid, sodium stearate, zinc stearate, aluminum stearate, dibutylammonium oleate, and dibutylammonium stearate.

The coated fabrics of this invention are extremely pliable over a wide temperature range, possess unusual resistance to solvents, greases, and oil, and due to the inherent light color of the superpolyester-amides, can be prepared in any shade or color. This latter property is particularly desirable since most materials which are of practical value in fabric coating are rather highly colored and light-colored coatings, tints and pastel shades cannot therefore be obtained. The coated fabrics of this invention are unusually durable as is shown by their high resistance to failure under flexual, scrub, or abrasive action.

The improved coated fabrics obtained in accordance with this invention can be employed in almost any application wherein coated fabric or leather are now used, particularly where oil and grease resistance and flex durability are desired. Products of this kind include upholstery, shoe uppers, luggage, hospital sheeting, mine vent tubes, handbags, billfolds, vehicle covers, fuel pump diaphragms, flanges, refrigerator gaskets, shower curtains, sports jackets, raincoats, work clothes for use in the oil and dairy industries, and aprons for food dispensers.

As many apparently widely different embodiments of this invention may be made without departing from the spirit and scope thereof, it is to be understood that we do not limit ourselves to the specific embodiments thereof except as defined in the appended claims.

We claim:

1. As an article of manufacture, flexible fabric sheet material having a coating of a composition comprising a high molecular weight polymer which comprises the reaction product of an organic polyisocyanate with a linear polyester-amide containing from 50% to 95% ester groups based on the total ester and amide groups present.

2. The article set forth in claim 1 in which said polyisocyanate is a diisocyanate.

3. The article as defined in claim 1 in which said polymer is the reaction product of a mixture of bifunctional reactants comprising a dibasic carboxylic acid, a diamine and a glycol.

4. The article as defined in claim 1 in which said polymer is the reaction product of a mixture of bifunctional reactants comprising a dibasic carboxylic acid and a monoaminomonohydric alcohol.

5. A process for manufacturing coated flexible sheet material which comprises calendering over a flexible sheet a coating of a composition comprising a high molecular weight polymer which comprises the reaction product of an organic polyisocyanate with a linear polyester-amide containing from 50% to 95% ester groups based on the total ester and amide groups present, said polyester-amide being the initial low molecular weight reaction product of a polymer-forming composition consisting essentially of a mixture of bifunctional reactants providing complementary amide-forming and ester-forming groups.

6. As an article of manufacture, flexible fabric sheet material having a coating of a composition comprising a high molecular weight polymer which comprises the reaction product of an organic polyisocyanate with the linear polyester-amide obtained from ethylene glycol, ethanolamine and adipic acid.

7. As an article of manufacture, flexible fabric material having a base coating of synthetic linear polyamide and having applied over said base coating a coating of a composition comprising a high molecular weight polymer which comprises the reaction product of an organic polyisocyanate with a linear polyester-amide containing from 50% to 95% ester groups based on the total ester and amide groups present, said linear polyamide forming the base coating comprising the reaction product of reacting material selected from the group consisting of (a) monoaminomonocarboxylic acids, and (b) mixtures of dibasic carboxylic acid with diamine.

8. As an article of manufacture, flexible fabric material having a base coating of synthetic linear polyamide and having applied over said base coating a coating of a composition comprising a high molecular weight polymer which comprises the reaction product of an organic polyisocyanate with a linear polyester-amide containing from 50% to 95% ester groups based on the total ester and amide groups present, said linear polyamide forming the base coating being an interpolyamide comprising the reaction product of a polyamide-forming composition containing a mixture of polyamide-forming reactants selected from the group consisting of diamines, dibasic carboxylic acids, and monoaminomonocarboxylic acids.

9. The article as defined in claim 1 in which said polymer is the reaction product of a mixture of bifunctional reactants comprising a dibasic carboxylic acid, a monoaminomonohydric alcohol and a glycol.

ROBERT EDWARD CHRIST.
WILLIAM EDWARD HANFORD.